US012759126B2

(12) United States Patent
Heller et al.

(10) Patent No.: US 12,759,126 B2
(45) Date of Patent: Oct. 13, 2026

(54) HAND-HELD POWER TOOL

(71) Applicant: Hilti Aktiengesellschaft, Schaan (LI)

(72) Inventors: Matthias Heller, Jengen (DE); Ulrich Mandel, Buchloe Honsolgen (DE); Thomas Hofbrucker, Mammendorf (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 19/141,812

(22) PCT Filed: Dec. 6, 2023

(86) PCT No.: PCT/EP2023/084489
§ 371 (c)(1),
(2) Date: Jun. 20, 2025

(87) PCT Pub. No.: WO2024/149528
PCT Pub. Date: Jul. 18, 2024

(65) Prior Publication Data

US 2026/0208343 A1 Jul. 23, 2026

(30) Foreign Application Priority Data

Jan. 12, 2023 (EP) .................................... 23151323

(51) Int. Cl.
*B25D 17/24* (2006.01)

(52) U.S. Cl.
CPC .......... *B25D 17/24* (2013.01); *B25D 2222/06* (2013.01); *B25D 2222/57* (2013.01); *B25D 2250/121* (2013.01); *B25D 2250/335* (2013.01)

(58) Field of Classification Search
CPC ................................ B25D 17/24; F16C 17/18
USPC ...................................................... 173/162.1
See application file for complete search history.

(56) References Cited

U.S. PATENT DOCUMENTS 3,601,459 A * 8/1971 Cutting ................ F16C 27/063 384/100
5,033,871 A * 7/1991 Ide ........................ F16C 17/035 384/312
5,531,524 A * 7/1996 Brouwer ................ F16C 17/10 384/220
7,695,194 B2 * 4/2010 Bouru ..................... F16C 17/18 384/907.1

(Continued)

FOREIGN PATENT DOCUMENTS

DE 4000861 A1 7/1991
DE 202005007332 U1 9/2005

(Continued)

*Primary Examiner* — Nathaniel C Chukwurah
(74) *Attorney, Agent, or Firm* — Davidson Kappel LLC

(57) ABSTRACT

A hand-held power tool (1) for at least partially axially striking material machining, including an inner housing (12) in which at least one striking mechanism (8) is arranged, and an outer housing (16) which at least partially surrounds the inner housing (12). In order to decouple an axial movement of the inner housing (12) relative to the outer housing (16), a bearing (4) is arranged between the inner housing (12) and the outer housing (16). The bearing (4) includes an elastic ring (20) applied to the inner housing (12), in which ring (20) a plurality of sliding blocks (24) are embedded on an outer circumferential surface, which come into sliding contact with the outer housing (16).

10 Claims, 3 Drawing Sheets

(56) References Cited

U.S. PATENT DOCUMENTS

| | | | | |
|---|---|---|---|---|
| 9,272,408 | B2 * | 3/2016 | Koch | B25D 17/24 |
| 2005/0263308 | A1 | 12/2005 | Chang et al. | |
| 2007/0277992 | A1 | 12/2007 | Fuenfer et al. | |

FOREIGN PATENT DOCUMENTS

| | | | |
|---|---|---|---|
| EP | 0059230 | B1 | 4/1986 |
| EP | 1787762 | A1 | 5/2007 |
| EP | 1862266 | A2 | 12/2007 |

* cited by examiner

HAND-HELD POWER TOOL

The present invention relates to a hand-held power tool for at least partially axially striking material machining.

BACKGROUND

The field of application of the invention extends primarily to hand-held hammer drills or chisel hammers, which are equipped with an electric-motor-driven drive. Such electric hand tools generate a linearly alternating working movement via a mechanical striking mechanism, i.e., a reciprocating movement to be applied to the tool, which, in the case of a chisel hammer, is designed as a mortise chisel and, in the case of a hammer drill, as a percussion drill for working on preferably mineral materials-such as stone, concrete, and the like.

SUMMARY OF THE INVENTION

Due to the interaction with the workpiece and the hand-arm system of the operator as well as the internal mass and stiffness distribution, an electric hand tool that can drive a tool to strike normally has complex vibration behavior that must be suppressed as far as possible.

EP 0059 230 B1 discloses a self-lubricating elastic bearing to be inserted between two elements rotating relative to one another. The bearing consists of an elastomer bearing bush having an inner surface with a small coefficient of friction, which interacts with the inner element or with an element firmly connected thereto, and having an outer surface which is arranged in a bearing housing. At least three projecting bearing surfaces are provided in an angularly distributed manner on the outer surface of the bearing bush or in the aforementioned bearing housing in order to deform the inner friction surface of the bearing bush, so that its contact with the aforementioned inner element along the axial pre-load regions of the bearing bush is ensured, with the effect of centering and vibration dampening between the two aforementioned elements.

It is an object of the present invention to provide a hand-held power tool with which vibrations can be reduced using simple technical means.

The present invention provides a hand-held power tool (1) for at least partially axially striking material machining, comprising an inner housing (12) in which at least one striking mechanism (8) is arranged, and an outer housing (16) which at least partially surrounds the inner housing (12), wherein a bearing (4) is arranged between the inner housing (12) and the outer housing (16) in order to decouple an axial movement of the inner housing (12) relative to the outer housing (16), characterized in that the bearing (4) comprises an elastic ring (20) applied to the inner housing (12), in which ring (20) a plurality of sliding blocks are (24) embedded on an outer circumferential surface, which come into sliding contact with the outer housing (16).

The invention includes the technical teaching that the bearing comprises an elastic ring applied to the inner housing, in which ring a plurality of sliding blocks are embedded on an outer circumferential surface, which sliding blocks come into sliding contact with the outer housing. Radial vibrations and shocks between the inner housing and the outer housing can thus be dampened by a compression of the elastic ring. In addition, a sliding bearing is formed in a simple manner via the sliding blocks, via which sliding bearing an axial movement of the inner housing relative to the outer housing can be decoupled. Various functions can thus be fulfilled via the sliding bearing designed in this way. Advantageously, the elastic material is an elastomer.

According to a preferred embodiment, the sliding blocks are made of a sintered material. The sliding blocks are produced by means of a sintering process. Such a production process allows for the sliding blocks to be produced in a simple technical manner. Such a sliding block still has a certain porosity after sintering. Due to this porosity, lubricants are stored in the pores and can be better provided by the sliding block, so that improved lubrication of the bearing is enabled by a sliding block formed from sintered material.

According to another preferred embodiment, the sliding blocks are formed from a carbon-fiber-reinforced plastic. Components made of carbon-fiber-reinforced plastic are lighter than components made of metal. With such sliding blocks, a low weight can accordingly be obtained for a hand-held power tool, which improves the handling of such a hand-held power tool.

Preferably, holding means are arranged on an inner surface of the elastic ring, which interact with the sliding blocks so that the sliding blocks are held in the cutouts of the elastic ring. Holding means are understood to mean any designs of the elastic ring or separately arrangeable components which, after installation of the sliding blocks, make removal of the sliding blocks more difficult. After the sliding blocks have been introduced, such holding means ensure that the sliding blocks do not unintentionally disengage from the elastic ring before the hand-held power tool is completely assembled. Assembly of the hand-held power tool is thereby simplified.

Alternatively or additionally, the sliding blocks have holding means which, after assembly of the sliding blocks, interact with the elastic ring so that the sliding blocks are held in the cutout of the elastic ring. The holding means are advantageously designed as detent lugs. Accordingly, assembly of the hand-held power tool can also be simplified with holding means on the sliding blocks.

Advantageously, the elastic ring forms portions that are radially offset relative to one another, wherein the sliding blocks resting against the outer housing are arranged in radially outer portions, whereas the radially inner portions rest against the inner housing. The elastic ring has a meandering shape. A portion is understood to mean a region of the elastic ring which continuously has the same outer or inner radius. The radially inner portions have a smaller inner radius than the outer portions. Accordingly, the outer portions do not rest against the inner housing. A spring effect for the sliding block is provided via the elastic ring so that the sliding block rests resiliently against the outer housing. As a result, the inner housing is supported without play on the outer housing by the bearing. In addition, radial vibrations or shocks can be absorbed by the spring effect.

Preferably, defined recesses are formed on the inner housing in the region below the sliding blocks so that the sliding blocks are held resiliently between the inner housing and the outer housing via the elastic ring. The sliding blocks thus do not rest against the inner housing, so that a radial movement of the sliding blocks is possible. Accordingly, the bearing can be supported on the outer housing without play here as well. As a result of the spring effect of the sliding blocks, radial vibrations or shocks can thus be decoupled. As a function of the selected geometry of the elastomer, of cutouts on the inner housing, and of the elastomer material, the spring characteristic curve of decoupling can be adjusted as desired.

In an advantageous embodiment, the bearing is arranged in the region of a side handle fastening. A side handle fastening is a device by means of which a user can fix a side handle, after positioning, to the outer housing of the hand-held power tool via frictional connection. A retaining ring is often tightened on the outer housing in this process. Such fixing often results in a deformation of the outer housing. According to the prior art, such a deformation would lead to an uneven bearing in this region. As a result of the spring effect of the sliding blocks according to the invention, such a deformation can be compensated for so that, despite a deformation of the outer housing, the latter can still be supported evenly relative to the inner housing.

The elastic ring is advantageously arranged in a pre-stressed state on the inner housing. The inner radius of the elastic ring is slightly smaller than the outer radius of the inner housing. The elastic ring is accordingly applied to the inner housing in a stretched state. This pre-stressed state ensures that a sufficient spring effect can be achieved directly with a radial deflection of the sliding blocks embedded in the elastic ring. A required spring force of the sliding blocks can also be set via a degree of pre-stressing.

The elastic material preferably has a hardness of 70-90 Shore A. A material having such a hardness has good dampening values for dampening the vibrations and shocks of a hand-held power tool.

The elastic ring is preferably arranged in a depression of the inner housing. The inner housing thus has a depression which has at least the width of the elastic ring. The elastic ring is thus held at the corresponding position via the depression and can thus not get out of place. As a result, it can be ensured that the elastic ring is permanently held at the predetermined position.

BRIEF DESCRIPTION OF THE DRAWING

Further measures improving the invention are explained in more detail below together with the description of a preferred exemplary embodiment. In the drawings.

DETAILED DESCRIPTION

Figure 1:
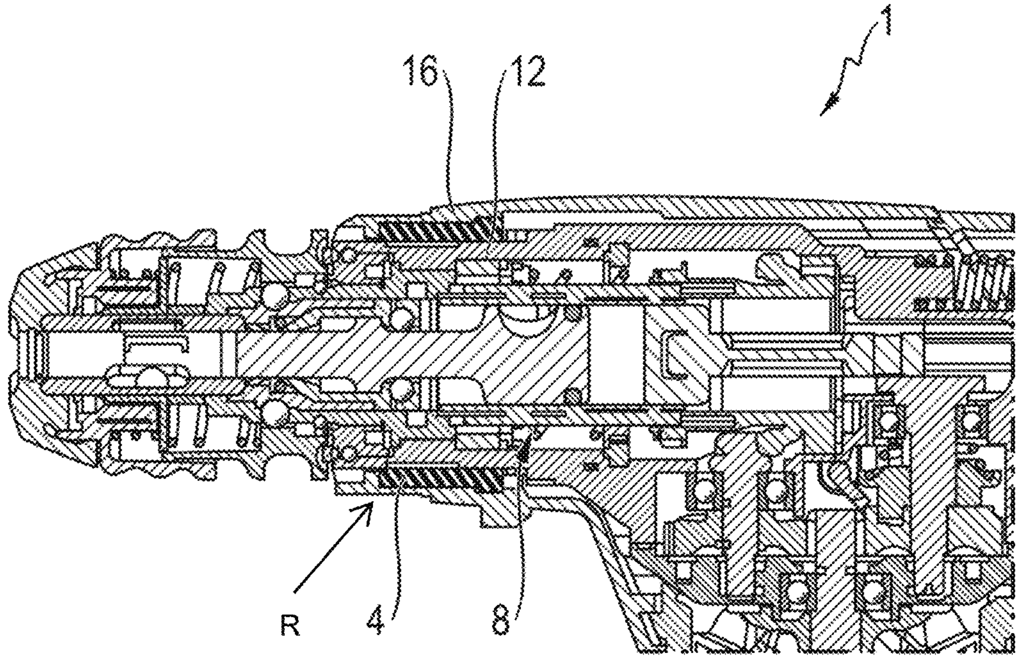
FIG. 1 shows a partial longitudinal section of a hand-held power tool having a bearing according to the invention.

FIG. 1 shows a longitudinal section of a hand-held power tool 1 having a bearing 4 according to the invention. The hand-held power tool 1 has a striking mechanism 8 via which an axial strike pulse can be transmitted to a striking tool. The striking mechanism 8 is arranged in an inner housing 12. The inner housing 12 is partially surrounded by an outer housing 16. The bearing 4 is arranged between the inner housing 12 and the outer housing 16 at a region R for a side handle fastening, which bearing 4 supports an axial movement of the inner housing 12 relative to the outer housing 16. The inner housing 12 is decoupled relative to the outer housing 16 via the bearing 4.

Figure 2:
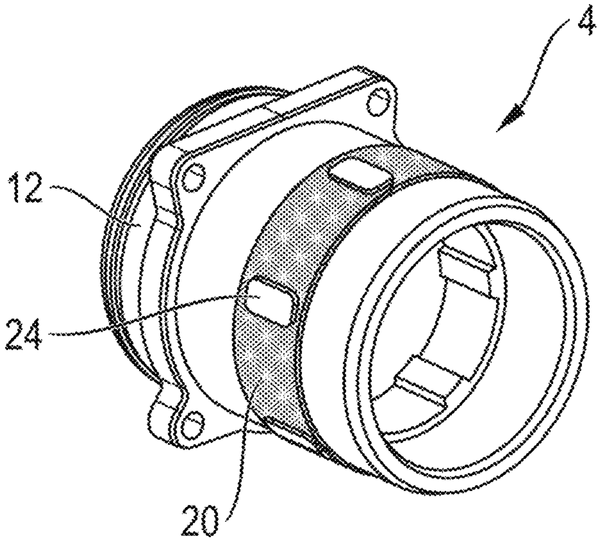
FIG. 2 shows a perspectival view of a part of the inner housing with an exemplary embodiment of the bearing according to the invention.

FIG. 2 shows a perspectival view of a part of the inner housing 12 with an exemplary embodiment of the bearing 4 according to the invention. The bearing 4 is formed from an elastic ring 20 which is applied to the inner housing 12. A plurality of sliding blocks 24 which project beyond the elastic ring 20 in a radial direction are arranged on the elastic ring 20. In an assembled state of the hand-held power tool 1, the sliding blocks 24 rest against an inner side of the outer housing 16. A sliding axial movement of the inner housing 12 relative to the outer housing 16 is ensured by the sliding blocks 24.

Figure 3:
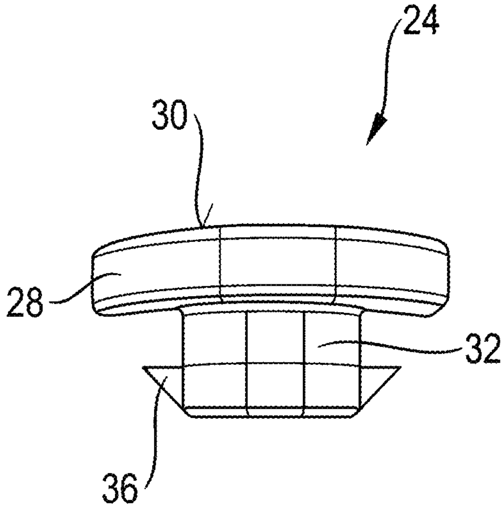
FIG. 3*a* shows a view of a sliding block according to an exemplary embodiment of the invention.
FIG. 3*b* shows a perspectival view of the sliding block according to FIG. 3*a;*
Figure 3:
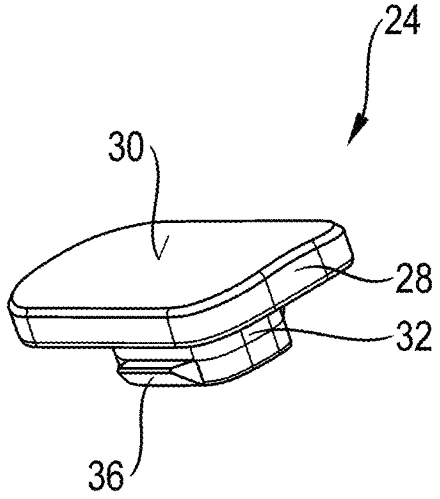

FIGS. 3*a* and 3*b* show a view of a sliding block 24 according to an exemplary embodiment of the invention. The sliding block 24 consists of a base body 28 which has a convex sliding surface 30. In an assembled state, the sliding surface 30 rests against an inner side of the outer housing 16. A radius of the convex sliding surface 30 corresponds to an inner radius of the outer housing 16. The sliding block 24 has an extension 32 which extends from the base body 28 on a side facing away from the sliding surface 30. Detent lugs 36 are arranged on the extension 32 in a region of an axial end which, after assembly, interact with the elastic ring 20 so that the sliding block 24 is held on the ring 20.

Figure 4:
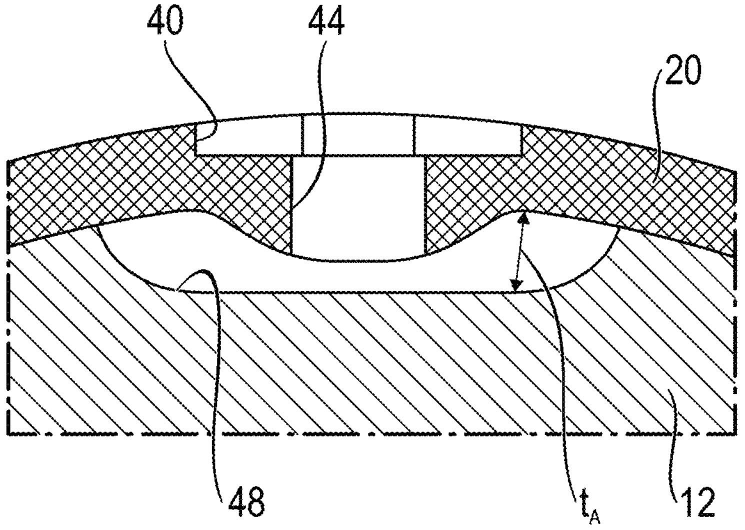
FIG. 4 shows a section through a region of the elastic ring in a state mounted on the inner housing.

FIG. 4 shows a section through a region of the elastic ring 20 in a state mounted on the inner housing 12. For reasons of clarity, the sliding block 24 is not shown in this figure. The elastic ring 20 has a cutout 40 which partially receives at radial height the base body 28 of the sliding block 24. Accordingly, the cutout 40 has the same shape as the sliding block 24. The elastic ring 20 has, in addition, an opening 44 into which the extension 32 of the sliding block 24 projects. The inner housing 12 has recesses 48 in the region below the cutout 40 and the opening 44, the depth $t_A$ of which recesses 48 is configured such that the sliding block 24 is held resiliently above the recess 48.

Figure 5:
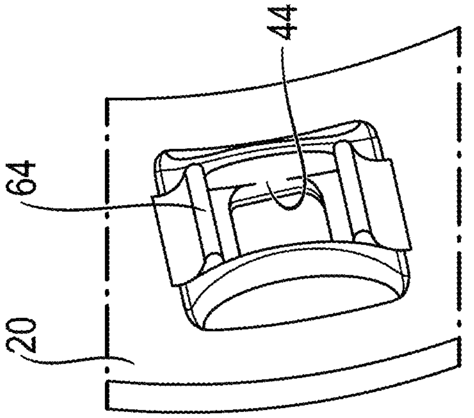
FIG. 5*a* shows a side view of the elastic ring with sliding blocks according to an exemplary embodiment of the invention.
FIG. 5*b* shows a perspectival view of the elastic ring according to an exemplary embodiment of the invention.
FIG. 5*c* shows an enlarged view of an inner side of the elastic ring in the region of the opening.
Figure 5:
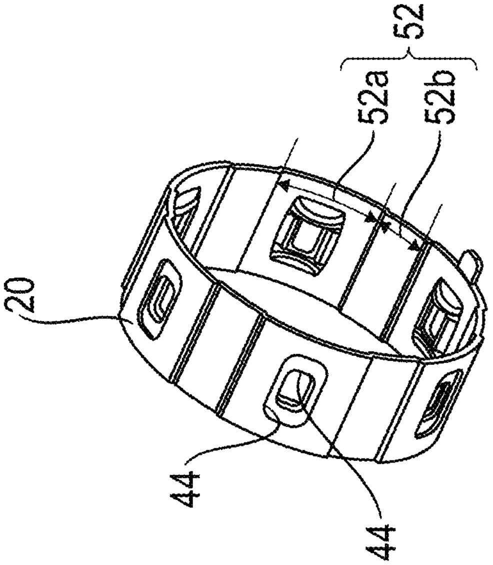
Figure 5:
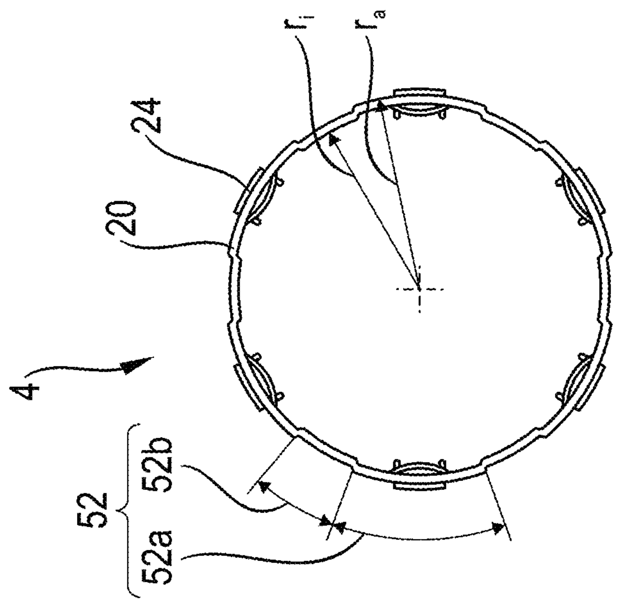

FIG. 5*a* shows a side view of the elastic ring 20 with sliding blocks 24 according to an exemplary embodiment of the invention. Contrary to the exemplary embodiment of the elastic ring 20 from FIG. 2, the elastic ring 20 in this figure has different outer or inner radii $r_a$, $r_i$. The elastic ring 20 is subdivided into a plurality of portions 52 along the circumference. The portions 52 are arranged corresponding to the sliding blocks 24, wherein the sliding blocks 24 are each arranged in outer portions 52*a*. Inner portions 52*b* are provided between the outer portions 52*a*, wherein the outer portions 52*a* have a larger inner radius $r_i$ than the inner portions 52*b*. The elastic ring 20 rests against the inner housing 12 only via the inner portions 52*b*. The outer portions 52*a* thus do not rest on the inner housing 12, so that a spring effect of the sliding blocks 24 is improved.

FIG. 5*b* shows a perspectival view of the elastic ring 20 according to an exemplary embodiment of the invention. For reasons of clarity, this figure is shown without sliding blocks 24. This figure substantially shows the features already shown in the preceding figures. FIG. 5*c* shows an enlarged view of an inner side of the elastic ring 20 in the region of the opening 44. In this region, elastic knobs 64 are formed around the opening 44, via which knobs 64 the sliding block 24 is secured during assembly.

LIST OF REFERENCE SIGNS

1 Hand-held power tool
4 Bearing

8 Striking mechanism
12 Inner housing
16 Outer housing
20 Elastic ring
24 Sliding block
28 Base body
30 Sliding surface
32 Extension
36 Detent lugs
40 Cutout
44 Opening
48 Recesses
52 Portion
52*a* Outer portion
52*b* Inner portion
64 Elastic knob
$t_A$ Depth
$r_a$ Outer radius
$r_i$ Inner radius

What is claimed is:

1. A hand-held power tool for at least partially axially striking material machining, the hand-held power tool comprising:
- an inner housing;
- a striking mechanism arranged in the inner housing;
- an outer housing at least partially surrounding the inner housing; and
- a bearing arranged between the inner housing and the outer housing to decouple an axial movement of the inner housing relative to the outer housing;
- the bearing including an elastic ring applied to the inner housing and a plurality of sliding blocks embedded in the elastic ring on an outer circumferential surface, the sliding blocks in sliding contact with the outer housing.

2. The hand-held power tool as recited in claim 1 wherein the sliding blocks are made of a sintered material.

3. The hand-held power tool as recited in claim 1 wherein the sliding blocks are made of a carbon-fiber-reinforced plastic.

4. The hand-held power tool as recited in claim 1 wherein at least one holder is arranged on an inner surface of the elastic ring to interact with the sliding blocks so that the sliding blocks are held in cutouts of the elastic ring.

5. The hand-held power tool as recited in claim 1 wherein the elastic ring forms portions radially offset relative to one another, wherein the sliding blocks are arranged in radially outer portions, and the radially inner portions rest against the inner housing.

6. The hand-held power tool as recited in claim 1 wherein defined recesses are formed on the inner housing in a region below the sliding blocks so that the sliding blocks are held resiliently between the inner housing and the outer housing via the elastic ring.

7. The hand-held power tool as recited in claim 1 wherein the bearing is arranged in a region of a side handle fastening.

8. The hand-held power tool as recited in claim 1 wherein the elastic ring is arranged in a pre-stressed state on the inner housing.

9. The hand-held power tool as recited in claim 1 wherein the resilient material has a hardness of 50-90 Shore A.

10. The hand-held power tool as recited in claim 1 wherein the elastic ring is arranged in a depression of the inner housing.

* * * * *